US012631456B1

(12) United States Patent
Schaeding et al.

(10) Patent No.: US 12,631,456 B1
(45) Date of Patent: May 19, 2026

(54) CAMERA TRACKING AND SMART STEERING FOR PAVING MACHINES

(71) Applicant: GOMACO Corporation, Ida Grove, IA (US)

(72) Inventors: Chad M. Schaeding, Ida Grove, IA (US); Matthew Morrison, Ida Grove, IA (US)

(73) Assignee: GOMACO Corporation, Ida Grove, IA (US)

( * ) Notice: Subject to any disclaimer, the term of this patent is extended or adjusted under 35 U.S.C. 154(b) by 236 days.

(21) Appl. No.: 17/875,631

(22) Filed: Jul. 28, 2022

Related U.S. Application Data

(60) Provisional application No. 63/226,284, filed on Jul. 28, 2021.

(51) Int. Cl.
| *G01C 21/16* | (2006.01) |
| *G01C 21/36* | (2006.01) |

(52) U.S. Cl.
CPC ..... *G01C 21/1656* (2020.08); *G01C 21/3602* (2013.01); *G01C 21/3647* (2013.01)

(58) Field of Classification Search
CPC ........ E01C 19/004; E01C 19/48; E01C 19/42; E01C 19/4893; E01C 23/07; E01C 19/506; E01C 19/4886; E01C 2301/16; E01C 23/088; E01C 23/04; G05D 1/02; G05D 1/0231; G05D 1/0234; G05D 1/0246; G05D 1/0251; G01C 21/1656; G01C 21/3602; G01C 21/3647
See application file for complete search history.

(56) References Cited

U.S. PATENT DOCUMENTS

| | | | | |
|---|---|---|---|---|
| 5,588,776 A | * | 12/1996 | Swisher, Jr. ........... | E01C 23/04 |
| | | | | 404/101 |
| 5,631,658 A | * | 5/1997 | Gudat ................... | E01C 19/004 |
| | | | | 701/1 |
| 9,963,836 B1 | * | 5/2018 | Brenner ................. | G01B 17/06 |
| 2007/0150148 A1 | * | 6/2007 | Rasmussen ........... | E01C 19/004 |
| | | | | 299/1.5 |
| 2008/0038059 A1 | * | 2/2008 | Frelich .................... | E01C 23/07 |
| | | | | 404/75 |
| 2008/0253834 A1 | * | 10/2008 | Colvard ................ | E01C 23/163 |
| | | | | 33/290 |
| 2014/0121960 A1 | * | 5/2014 | Park ....................... | G01C 21/12 |
| | | | | 701/494 |
| 2014/0186115 A1 | * | 7/2014 | Graham .............. | E01C 19/4873 |
| | | | | 404/75 |

(Continued)

*Primary Examiner* — Hunter B Lonsberry
*Assistant Examiner* — Henry R Hinton
(74) *Attorney, Agent, or Firm* — Suiter Swantz IP

(57) ABSTRACT

Paving machines and paving machine control systems utilize sensors to identify the location and orientation of paving machines and corresponding attachments. The control system implements a design profile by automatically adjusting actuators. The control system receives transition values to calculate a smooth transition including continuously adjusting actuator values with reference to the location and orientation of the paving machine. The control system may identify resurfacing values to repair a damaged surface by identifying an offset value of an existing surface to an ideal surface with reference to a disposition of the paving machine to minimize material usage.

17 Claims, 12 Drawing Sheets

(56)           References Cited

U.S. PATENT DOCUMENTS

| | | | |
|---|---|---|---|
| 2014/0331806 A1* | 11/2014 | Nagatsuka | B25J 18/00 |
| | | | 901/19 |
| 2015/0275482 A1* | 10/2015 | Hill | E02F 3/847 |
| | | | 701/50 |
| 2015/0312563 A1* | 10/2015 | Ito | H04N 13/398 |
| | | | 353/121 |
| 2017/0233958 A1* | 8/2017 | Utterodt | E01C 19/4833 |
| | | | 701/50 |
| 2020/0208356 A1* | 7/2020 | Engels | E01C 19/506 |
| 2020/0208357 A1* | 7/2020 | Engels | E01C 19/4893 |
| 2021/0010211 A1* | 1/2021 | Fritz | E01C 19/48 |
| 2021/0235617 A1* | 8/2021 | Yamamura | G05D 1/43 |
| 2022/0308228 A1* | 9/2022 | Raag | G01S 17/86 |
| 2023/0315119 A1* | 10/2023 | Hamalainen | G05D 1/245 |
| | | | 701/25 |

* cited by examiner

CAMERA TRACKING AND SMART STEERING FOR PAVING MACHINES

PRIORITY

The present application claims the benefit under 35 U.S.C. § 119(e) of U.S. Provisional App. No. 63/226,284 (filed Jul. 28, 2021), which is incorporated herein by reference.

BACKGROUND

Construction machines and the systems they employ are generally self-contained and need to be set up and specifically calibrated for the operation of the machines. Such systems include sting lines and total stations for locating a machine in space or along a predefined path but require significant set-up, maintenance, and professional operation. Furthermore, construction machines often include satellite positioning hardware such as Global Positioning System (GPS) antennas which do not require much set-up but may lack the precision necessary for many operations.

Likewise, coordinating a plurality of machines in a paving train is complicated, and even small errors can cause substantial and expensive faults in the paved surface. Where purely internal mechanisms are used (on-board cameras and GPS) such on-board systems must be tightly coordinated between machines.

Consequently, it would be advantageous if an apparatus existed that is suitable for coordinating complex construction machine movements and operations in minimal set-up and maintenance to a level of precision necessary for most construction tasks.

SUMMARY

In one aspect, embodiments of the inventive concepts disclosed herein are directed to paving machines and paving machine control systems that utilize sensors to identify the location and orientation of paving machines and corresponding attachments. The control system implements a design profile by automatically adjusting actuators.

In a further aspect, the control system receives transition values to calculate a smooth transition including continuously adjusting actuator values with reference to the location and orientation of the paving machine.

In a further aspect, the control system may identify resurfacing values to repair a damaged surface by identifying an offset value of an existing surface to an ideal surface with reference to a disposition of the paving machine to minimize material usage.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which:

FIG. 9 shows a top plan view of a concrete paving machine according to embodiments of the present disclosure;

DETAILED DESCRIPTION

Figure 1:
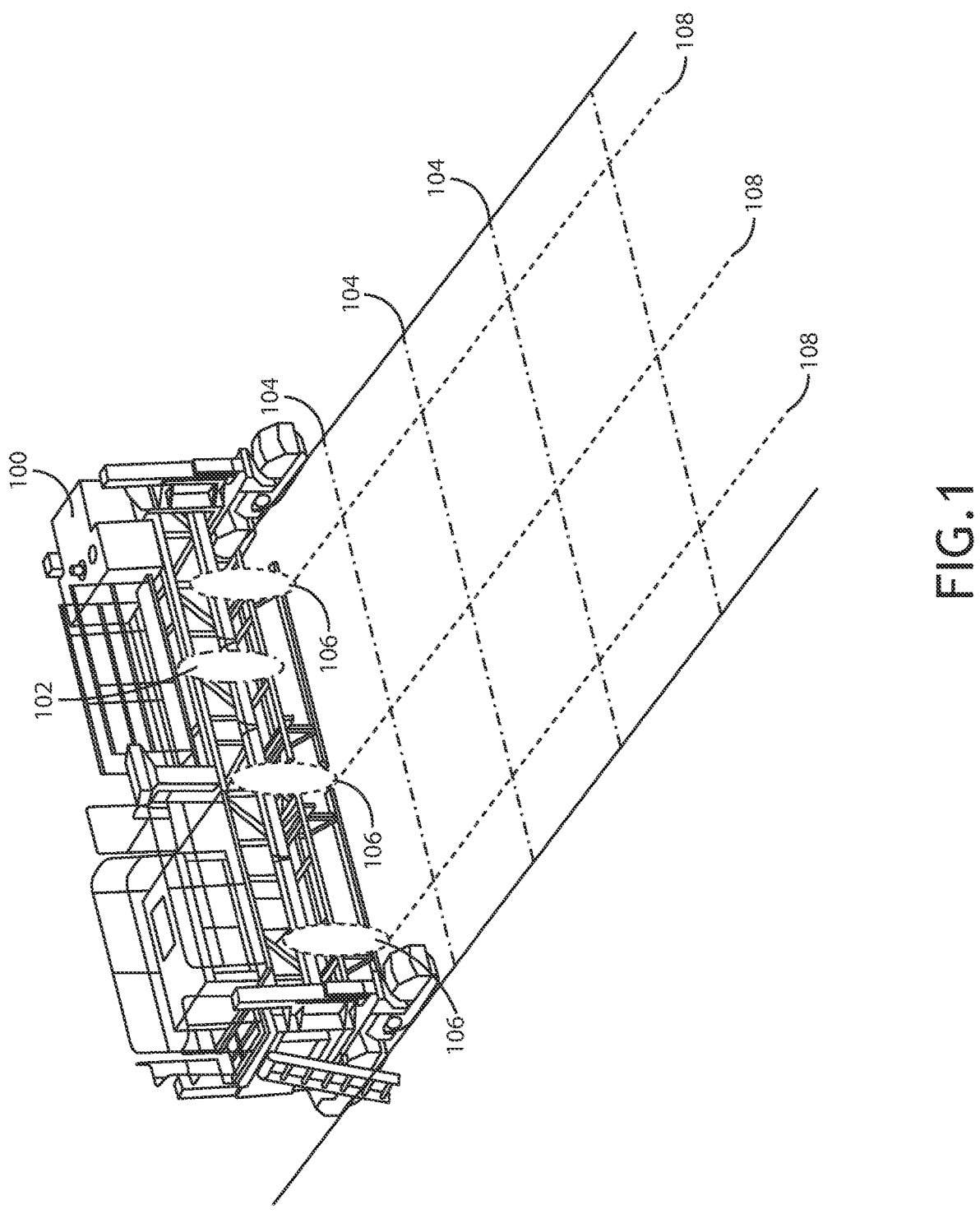
FIG. 1 shows a perspective view of paving machine with cutting attachments according to an exemplary embodiment.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to paving machines and paving machine control systems that utilize sensors to identify the location and orientation of paving machines and corresponding attachments. The control system implements a design profile by automatically adjusting actuators. The control system receives transition values to calculate a smooth transition including continuously adjusting actuator values with reference to the location and orientation of the paving machine. The control system may identify resurfacing values to repair a damaged surface by identifying an offset value of an existing surface to an ideal surface with reference to a disposition of the paving machine to minimize material usage.

Referring to FIG. 1, a perspective view of paving machine 100 with cutting attachments according to an exemplary embodiment is shown. The paving machine 100 includes a joint saw 102 for cutting expansion joints 104 in a paved surface and longitudinal cutting saws 106 for cutting longitudinal joints. An on-board positioning system tracks a current location of the paving machine 100, either locally with reference to some pre-positioned landmark (a string line, total station, another paving machine in a paving train, or the like) and controls the movement of the paving machine 100 and attachments 102, 106.

In at least one embodiment, the positioning system on-board the paving machine 100 stops the paving machine 100 at predefined dowel bar positions. The transverse joint saw 102 is then engaged and lowered to a predefined joint depth and the transverse expansion joint 104 is cut across the entire paved width. The transverse joint saw 102 is lifted to clear the surface and disengaged. The positioning system then drives the paving machine 100 forward and repeats the process of longitudinal saw cutting until the next transverse expansion joint 104.

In a paving train, reinforcing dowel bars may be placed at certain predefined locations by a first machine. Alternatively, or in addition, the first machine may place reinforcing dowel bars and register the locations with reference to some local or global position reference. Subsequently, a second machine may deposit paving material over the reinforcing dowel bars. When the paving material has hardened, the paving machine 100 cuts the expansion joints 104 at the reinforcing dowel locations. The paving machine 100 utilizes the same positioning system as was used to place and record the reinforcing dowel bar locations.

Figure 2:
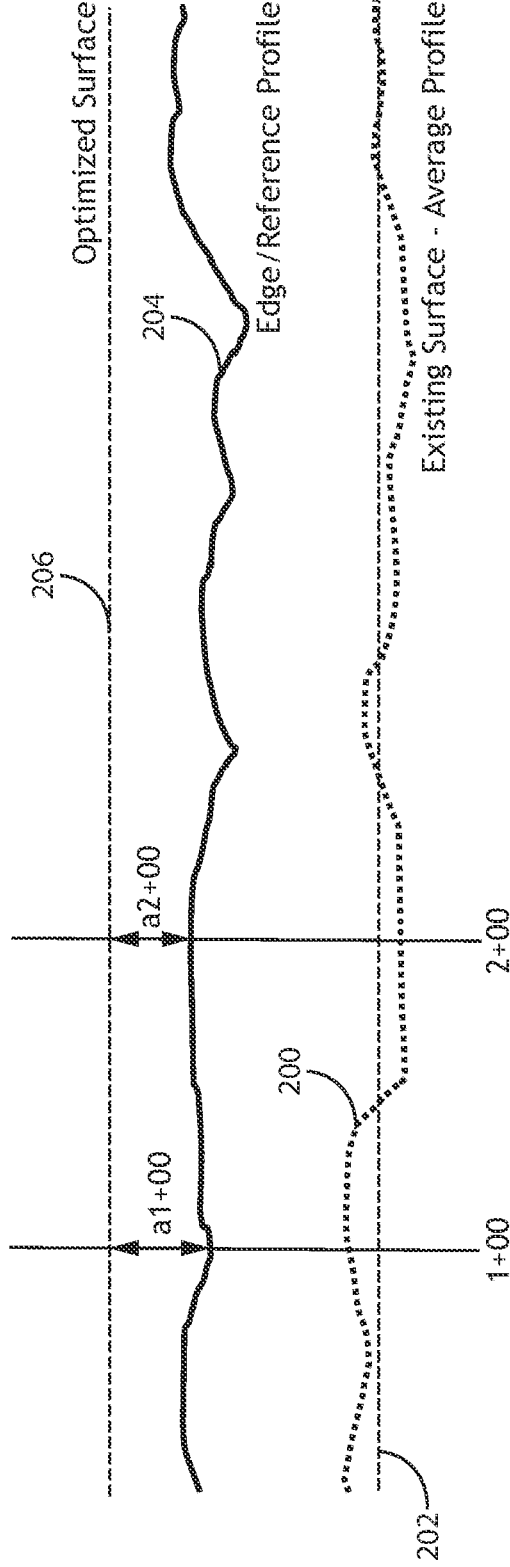
FIG. 2 shows graphs of the relationship between a reference and an optimized surface according to an exemplary embodiment.

Referring to FIG. 2, graphs of the relationship between a reference and an optimized surface according to an exemplary embodiment is shown. When covering an uneven surface 200, it would be desirable to produce a smooth, optimized surface 206 with a minimal amount of paving material. A paving machine includes at least one positioning sensor to measure the existing uneven surface 200 and a processor to record the surface measurements. The positioning sensor may include a dual axis angular sensor and a rigid wheel to measure and record an angular value corresponding to a linear offset of the contact point, for example, from a reference average 202 or some absolute reference point. The processor may continuously record such angular values for the entire uneven surface 200.

Alternatively, or in addition, the paving machine may include positional, angular, and non-contact sensors to improve a measurement production rate. The position sensors and the orientation measurements of a sensor mounting apparatus may be used to determine a relative position and orientation of the non-contact sensors with respect to the paving machine or some landmark on the paving machine, and thereby to some reference profile 204. The value of the non-contact measurements are then uses to determine the position of the point on the surface it's measuring. The processor stores all the surface position measurements.

Upon completion of the measuring of the surface, the processor may apply optimization constraints to determine the optimized surface 206. The optimized surface is then compressed into a series of correction values comprising offsets from the uneven surface 200 and reference surface 204 to arrive at a set of "smoothing offset" values that processor may add to the paving machine's grade control solution according to the position of the paving machine.

Figure 3A:
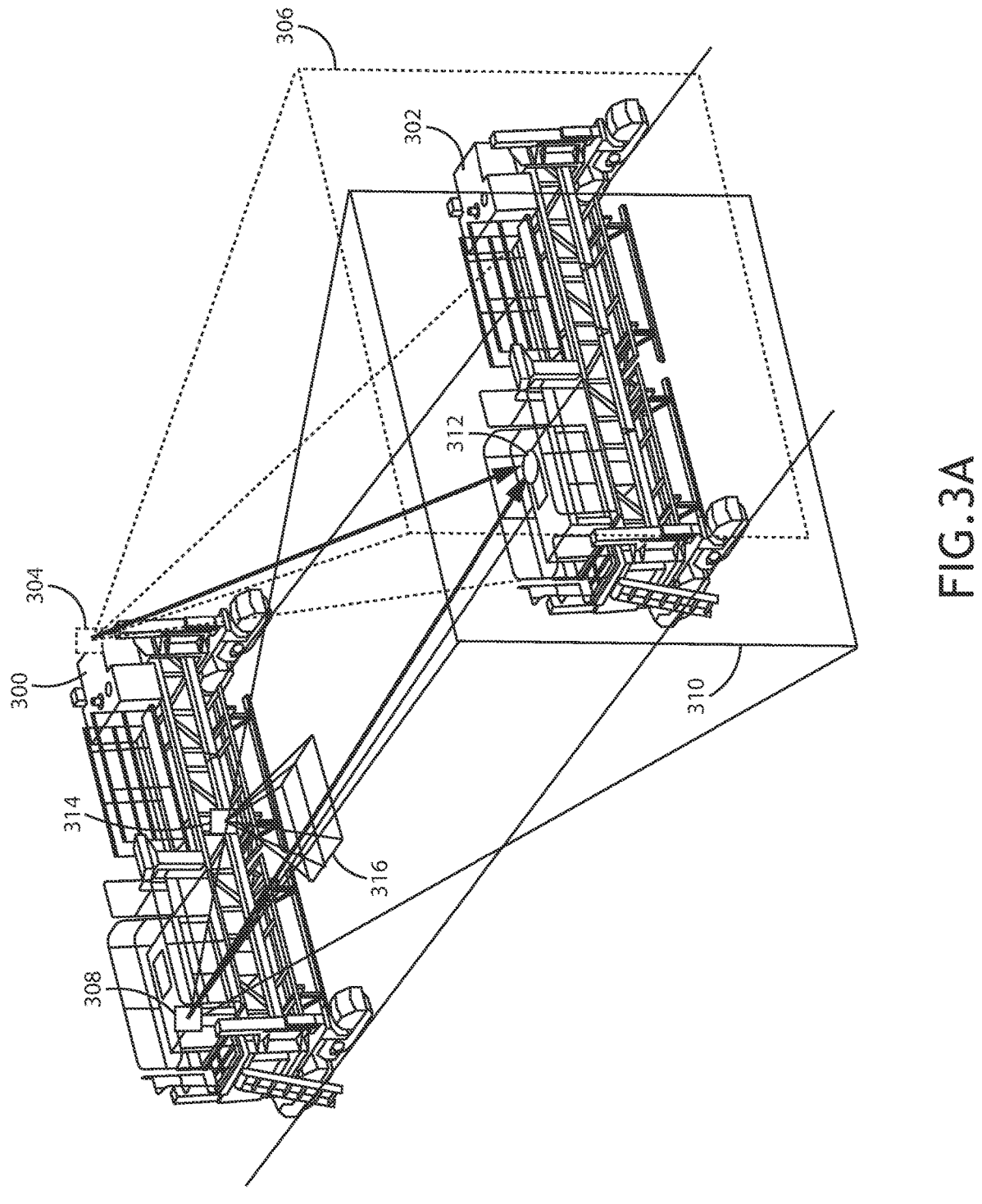
FIG. 3A shows a perspective view of machines according to an exemplary embodiment.
Figure 3B:
FIG. 3B shows a front view of a machine according to an exemplary embodiment.

Referring to FIG. 3, a perspective view of machines 300, 302 according to an exemplary embodiment is shown. One or more of the machines 300, 302 includes multiple, rigidly mounted cameras 304, 308. A first paving machine 300 includes a processor in data communication with the multiple cameras 304, 308, 314 to track relative or absolute positions of each of the machines 300, 302 and control steering, motion, and attached accessories of the machines 300, 302.

The cameras 304, 308 are rigidly mounted on the first paving machine 300 to provided overlapping images 306, 310 of a second paving machine 302 in a paving train. Camera images 306, 310 are continuously acquired then immediately processed to identify features 312 on the second paving machine 302, its attached accessories, other independent machines, survey control/tie points and the like. In at least one embodiment, because paving operations generally occur in an environment with substantial interference, the features 312 may be specially adapted to produce light in a wavelength suitable for easy detection by the cameras 304, 308.

In at least one embodiment, the positions of the cameras 304, 308 are measured using collinearity condition equations from known control points in a sequential least squares adjustment to solve for refinements to a current estimate of the camera positions. Bundle adjustment is an essential part of feature-based 3D reconstruction including Structurefrom-Motion (SIM) and Multi-View-Stereo (MVS). In aerial photogrammetry and computer vision, camera positions should be refined for subsequent processing of imagery data.

A processor records each camera's 304, 308 position, identified features 312 in the overlapping images 306, 310, the position and orientation of the first machines 300, derived positions and orientations of the second paving machine 302 and attached accessories, and control/tie points. In at least one embodiment, additional non-camera sensors (e.g., slope sensors) may be in data communication with the processor to provide additional orientation values for the first paving machine 300. The processor calculates and issues control commands to each paving machine 300, 302 and their attached accessories based on comparisons of measured values and a design profile that defines a shape and location of a paved surface. The computer system may then calculate absolute camera positions, imaged features 312, position and orientation of all the machines 300, 302 and attachments, and control/tie points based on the images 306, 310, along with the first machine's 3000 existing position and orientation sensors and previous calculated values.

In at least one embodiment, the computer system utilizes features 312 of the second machine 302 and attachments within the overlapping images 306, 310 to determine the location and orientation o the second machine 302. Furthermore, determining a precise location of features 312 within the overlap may allow the computer system to more precisely determine the location and orientation of features outside the overlapping zone and identify and calculate parallax of foreground or background features.

Camera images 306, 310 are continuously acquired then immediately processed to identify features 312 on the machines 300, 302, attachments, other independent mobile machines, and survey control/tie points. Control commands are provided to the machines 300, 302 and their attachments based on comparisons of measured values from a design profile. Finally, the first machines 300 receives control commands directly from the system, while independent machines and/or attachments receive their control commands from via a wireless connection.

In at least one embodiment, the first machine 300 may further include one or more additional sensors 314 configured to scan a portion 316 of the surface the first machine 300 is traveling over. The sensors 314 may be non-contact sensors such as a sonic or ultra-sonic sensor. In at least one embodiment, the sensor 314 may identify sub-surface features in the portion 316 of the surface such as rebar, and identify the directionality or orientation of such features. In at least one embodiment, the paving train may operate at least partially in an environment including one or more stringlines.

The first paving machine 300 may receive control commands directly from the processor while the second paving machine 302 and attached accessories may receive control commands from via a wireless data link (e.g., WIFI, Bluetooth, cellular, and the like). A construction or paving project may utilize several machines 300, 302 and devices, each incorporating some form of the system connected via some form of datalink.

Figure 4:
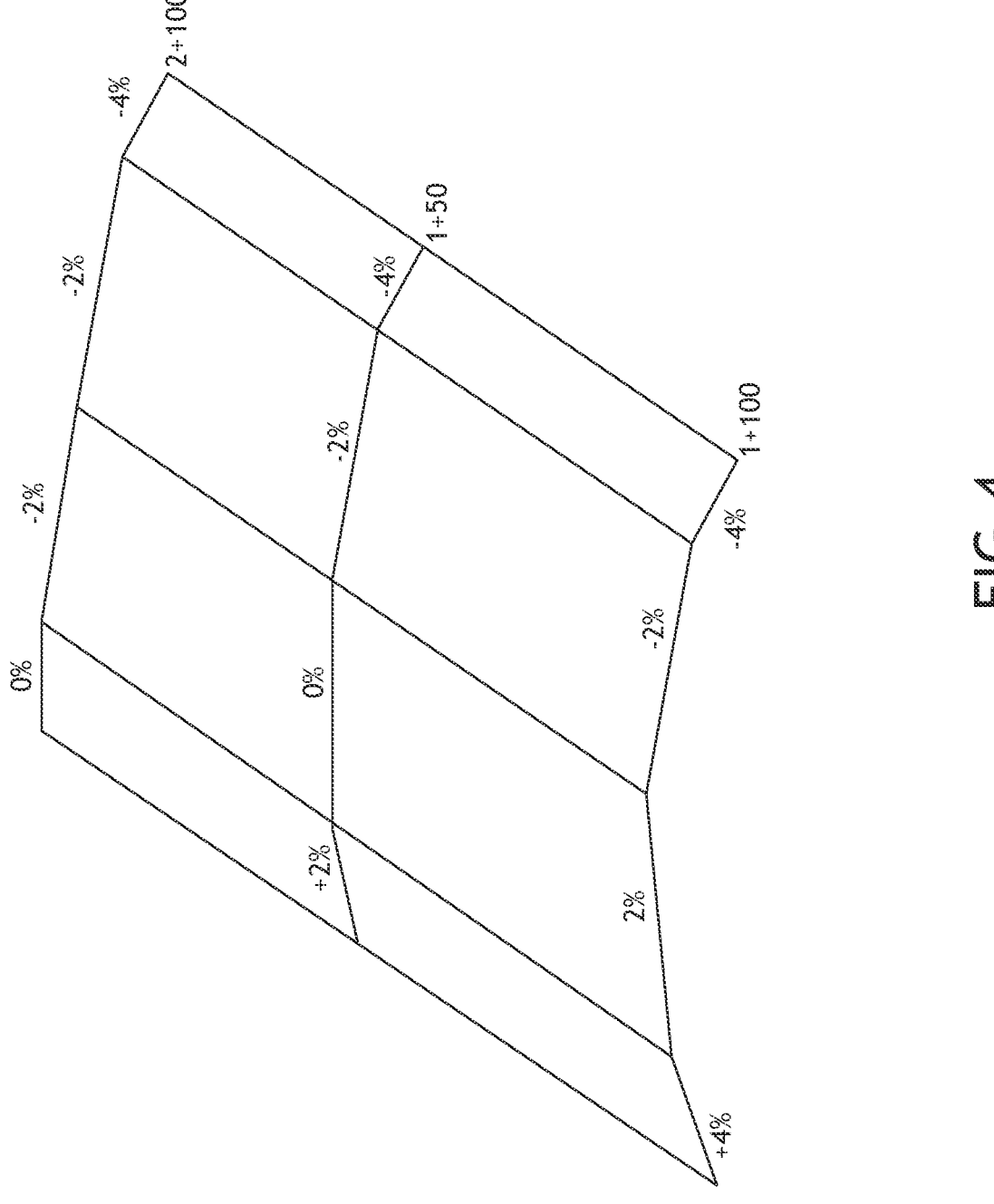
FIG. 4 shows a block representation of a slope field according to an exemplary embodiment.

Referring to FIG. 4, a block representation of a slope field according to an exemplary embodiment is shown. A system in a paving machine enables independent cross-slope control for simultaneous construction of multi-lane roads and highways. The system includes at least one sensor for each pan section in the paving machine that can directly measure the slope of the corresponding pan section, or the angular relationship between pan sections. At least one slope sensor is required to allow for interchangeable display and data entry options for the pan section state (e.g., a 2% slope). A self-supporting center pan sections slope is controlled by adjusting a main frame cross slope with leg adjustments (e.g., hydraulic actuators, linear actuators, or the like) and the center power transition adjustment apparatus. The outer pan sections can be directly controlled by their respective sensors through a system processor. Once all the pan sections are measured and deviations from a predefined design are determined, a correction is computed and applied via adjustments to the slopes of the pans. The design values (e.g., predefined slopes) may be pre-planned and imbedded into a design profile for execution by a machine control system (which may include the processor, or may be embodied in a separate monitoring system). The machine control system may adjust the movement, speed, orientation, etc. of the paving machine, and the disposition and orientation, including the slope and cross-slope of each pan.

Figure 5:
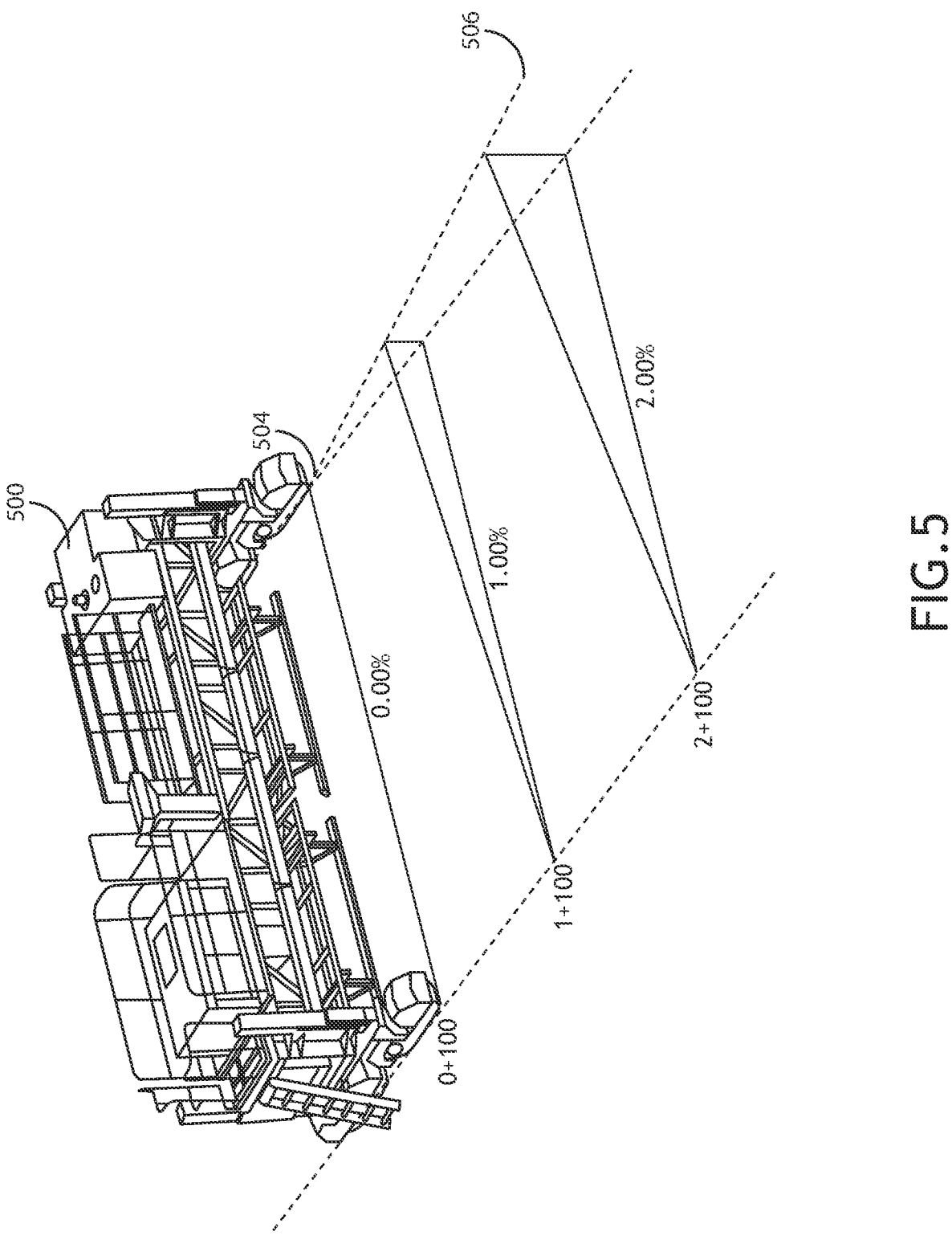
FIG. 5 shows a perspective view of a paving machine according to an exemplary embodiment.
Figure 6:
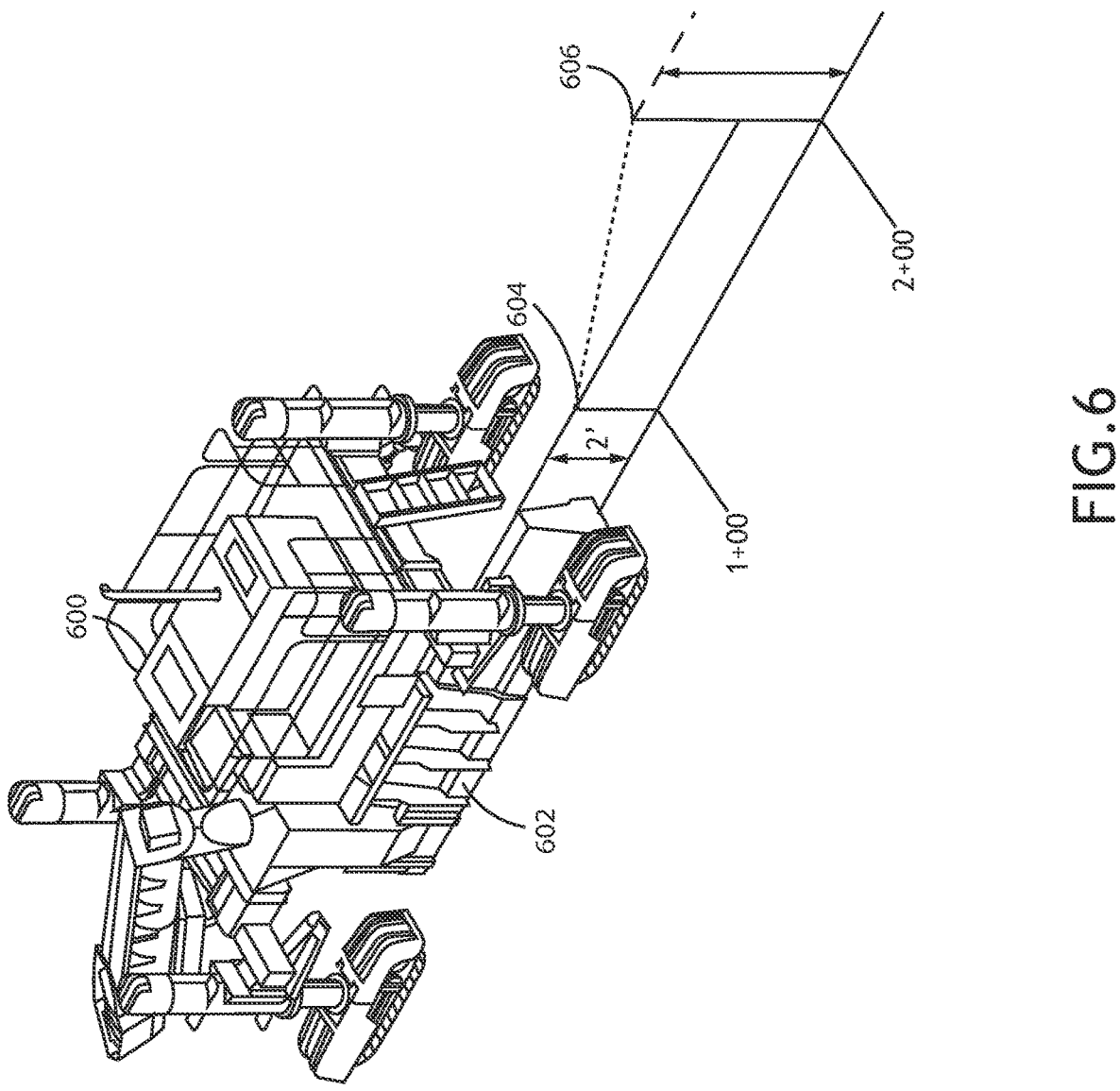
FIG. 6 shows a perspective view of a paving machine according to an exemplary embodiment.

Referring to FIGS. 5 and 6, perspective views of paving machine according to an exemplary embodiment is shown. In at least one embodiment, paving machines 500, 600 include an on-board computer system to control point transitions for the paving machines 500, 600 and their attachments 602 via one or more actuators including actuators corresponding to tracks driving the paving machine 500, 600. Set point variables define points 504, 506, 604, 606 along a transitional path (e.g., transition endpoints) for the paving machines 500, 600 and attachment control. The set point variables may be defined by linear displacements of one or more actuators as a function of the position of the paving machine 500, 600 along a path. The set point variables may be stored in a design profile, or may be entered into the computer system and stored in a nonvolatile memory.

The computer system may include some mechanism for a determining the position and orientation of the paving machine 500, 600 along a path (e.g., encoder, 3D stationing, manual adjustment, etc.). The computer system calculates the design value from the provided position and the transition model (e.g., linear/prorated, McConnell, spline, etc.). The computer system drives the paving machine 500, 600 and/or operates the attachments 602 via actuators. The computer system may utilize feedback loops to continuously monitor position and orientation values, and attachment 602 disposition, to return or maintain such values at their corresponding design values within some predefined threshold. In at least one embodiment, the computer system may utilize a trained neural network or other machine learning algorithm to associate monitored values with actuator and track adjustments to maintain the paving machine 500, 600 and attachments 602 within some threshold deviation of the design values.

The computer system allows additional transition segments to be added on-the-fly. In at least one embodiment, a paving machine interface allows manual entry of the transition data. The computer system may interpolate additional transition points 504, 506, 604, 606 to accommodate a smooth transition to any new manually entered transition data. Set point transition data may be automatically broadcast to and from an exterior system upon a request or at regular intervals. External calculation, storage, transmission, and sharing enable applications for paving machine 500, 600 guidance and attachment control. Such applications include, but are not limited to: automatic pan adjustment (e.g., pan slope and cross slope), frame slope adjustment, OTF swing legs, V2 and telescoping frames, variable height barriers, and applying smoothing ski offsets.

Figure 7:
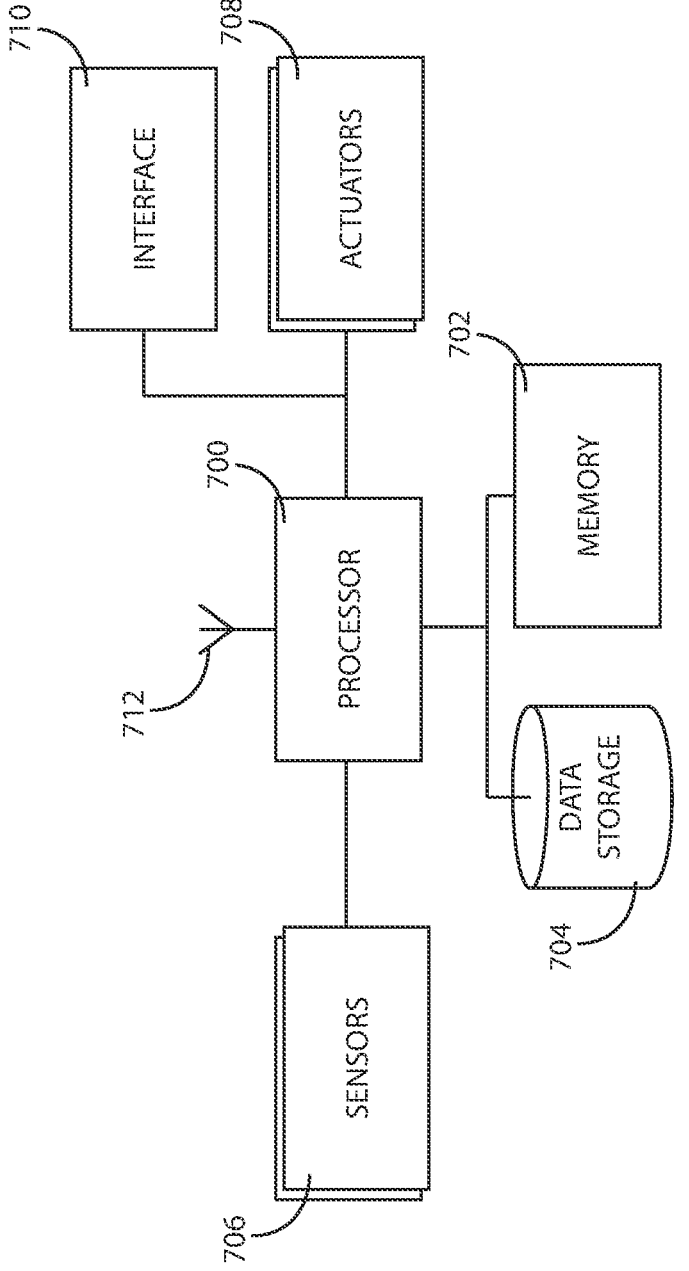
FIG. 7 shows a system suitable for implementing exemplary embodiments.

Referring to FIG. 7, a system suitable for implementing exemplary embodiments is shown. The system includes a processor 700, memory 702 for storing processor executable code, and a data storage device 704. The processor 700 is in data communication with one or more sensors 706, including, but not limited to: optical sensors (e.g., cameras, depth sensors, range cameras, infrared cameras, radiographic cameras, cameras adapted to specific wavelengths, etc.), position sensors (e.g., GPS receiver, total station receivers, accelerometers, compasses, gyroscopes, altimeters, etc.), surface sensors (e.g., contact sensors such as a rigid wheel, non-contact sensors such as ultrasonic or laser sensors, etc.), speedometers, anemometers, thermometers, barometers, including data from external sensors. The sensors 706 provide position, orientation, and attachment disposition of attachments on corresponding paving machines. The processor 700 correlates the position, orientation, and disposition data with a design profile stored in the data storage device 704. The design profile may include various design values defining transition segments in a design that provide offsets for actuators 708 (e.g., one/two lift cylinders, track angle rotation devices, pivot arm rotation devices, etc.) and track drive motors on the paving machine.

The system may include additional controllers/computers, subordinate (i.e., slaved) to the processor 700, to configure and control set components of the paving machine. The slave controllers are configured for processing and low-level data handling. For example, a slave controller may comprise an analog-to-digital converter that acts with a linear position sensor enabled cylinder to function as a virtual CAN based cylinder. The slave controller includes memory for storing configuration data and that can perform low-level processing, thereby reducing the load on the primary processor 700.

In at least one embodiment, a steering mechanism may include a slave controller to both compute a track angle and position, and forward geometric quantities directly to the processor 700. For precision synchronization of track angles, one leg/track may define a "master", the remaining legs/tracks "slaves", where controllers for the slave legs make computations based on the master leg. For example, slave legs calculate their own synchronization track angles. These synchronized track angles are a function of the master's track angle and the point of rotation (e.g., center of circle) with respect to the machine's geometry. In at least one embodiment, a desired track angle and speed may be communicated to the master leg or all the legs directly. Each slave controller then adjusts the mechanics as needed to obtain the desired state.

In at least one embodiment, a dead reckoning system utilizing multiple sensors 708 for calculating the forward travel distance over time and a previous known position and heading. The processor 700 determines consistency and accuracy of sensor data a data fusion algorithm by means of error estimates using all available data. Errors identified to be outside of predetermined tolerance result in the measurement being removed from the algorithm solution. When sensor data is found to be missing or corrupt, the processor 700 and paving machine may resume operation with warnings indicating the estimated error on the interface device 710. A dead reckoning error accumulates a preset tolerance to be used to automatically provide a stopping fault. When position sensor data is deemed consistent, it may be added back into the data fusion algorithm. In at least one embodiment, position sensor data is slowly and progressively weighted as the distance traveled increases. The rate or weight is dependent on the error accumulated in a dead reckoning mode.

In at least one embodiment, the system comprises a data link element 712 (e.g., a wireless connection such as WIFI, Bluetooth, cellular datalink, a controller area network, etc.) in data communication with the processor 700. The processor 700 may receive updated design profiles and design values in real time via the data link element 712, and incorporate such real-time updates during a paving operation. Furthermore, the system may include an interface device 710 in data communication with the processor 700 to receive new design values to incorporate into the design profile. The design values from the interface device 710 may be transmitted to an external system via the data link element 712.

In at least one embodiment, the data storage device 704 may store apriori knowledge of identifying features whose position and/or orientation are precisely known. The identifying features may correspond to points having a unique position (e.g., XYZ, ENU, Latitude/Longitude/Height). For example, the feature may be a tennis ball or light bulb with the center of the object being coincident with the coordinates. Such spherical features assist the system by virtue of their omnidirectional appearance which is easily identified by the sensors 706 (including optical sensors). Other features may be embedded objects that are observed with sub-surface sensors 706, such as rebar. The embedded objects may also have an orientation. Using the locations of these features, and observations collected by sensors 706, the processor 700 calculates the real-world location and orientation of the paving machine including. Further, the precise position and orientation of a machine tool or attachment can be calculated based on the dimensions of the machine and known location of the tool with respect to fixed reference points on the machine. Furthermore, the processor 700 may adjust one or more motors or actuators 708 to reposition or reorient the machine or tool to conform to a desired path or process.

Figure 8:
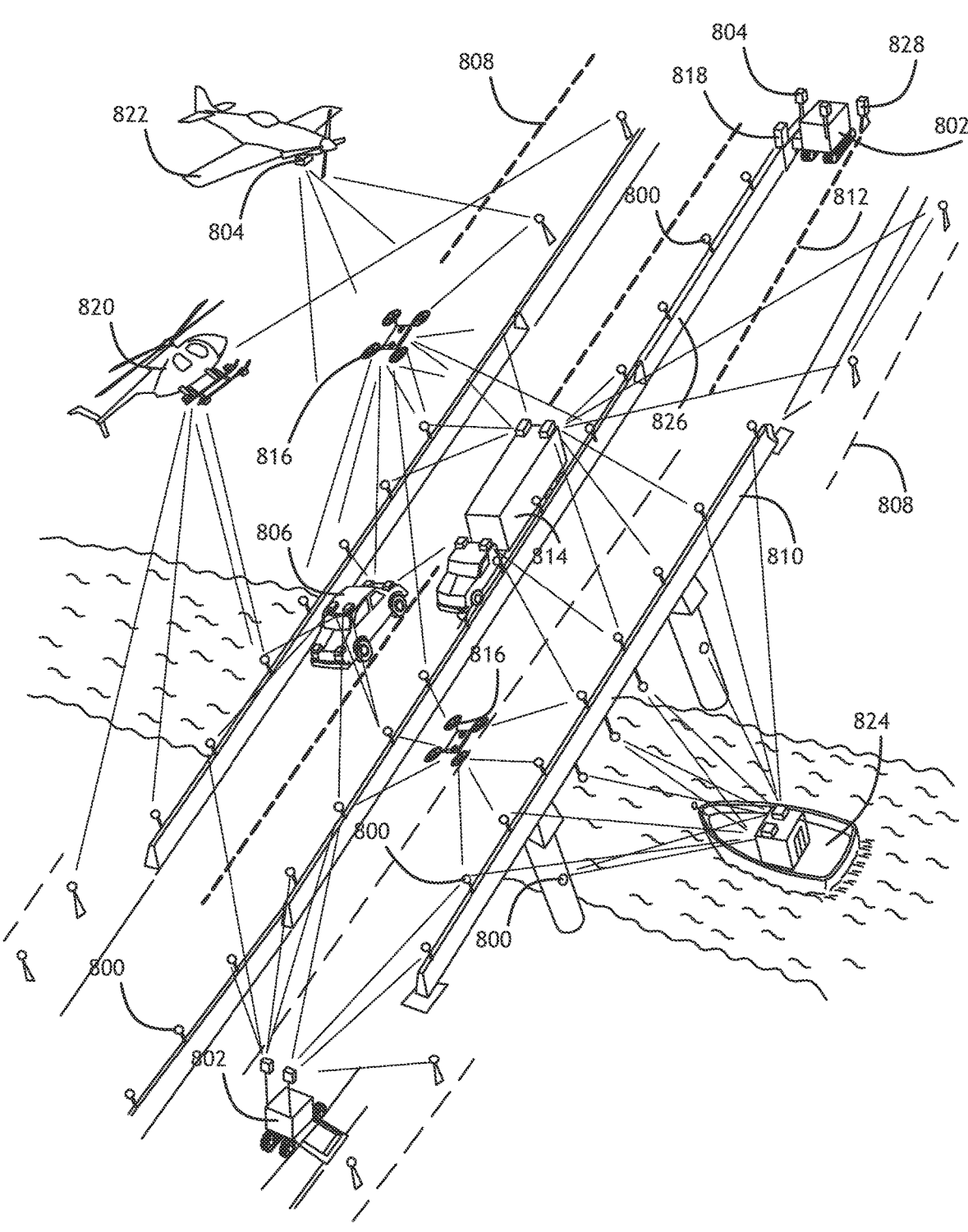
FIG. 8 shows an environmental view of a construction machine including embodiments of the present disclosure, the construction machine building a barrier while simultaneously inserting control features.

Referring to FIG. 8, an environmental view of a construction machine 802 including embodiments of the present disclosure, the construction machine 802 building a barrier while simultaneously inserting control features 800 is shown. A right of way 808 may be shared by many vehicles including one or more construction machines 802, automobiles 806, tractor-trailer truck 814, unmanned aerial vehicles (UAVs) 816, helicopters 820, airplanes 822, boats 824, etc. Various of the machines and vehicles 806, 814, 816, 820, 822, 824 operating in the environment may include cameras 804 or other sensors that image the surrounding environment, including encoded control features 800. In at least one embodiment, each of the various machines 806, 814, 816, 820, 822, 824 processes data from the connected cameras 804 or sensors to identify environmental features, other of the various machines 806, 814, 816, 820, 822, 824, the construction machine 802, and/or the encoded control features 800.

In at least one embodiment, the construction machine 802 receives the processed data and correlates the environmental features to create a local environmental map in real-time. The construction machine 802 uses the local environmental map to orient itself and identify disparities in the real environment as compare to a previously prepared design profile of local environment. Furthermore, the construction machine 802 may use local environmental map to identify transitory obstacles.

Some of the encoded control features 800 may be affixed to mounts that are automatically installed on a barrier/parapet wall 826, constructed by a construction machine 802, via a bar inserter 818. Additionally, the construction machine 802 may be equipped with an attached paint sprayer 828 to precisely mark the surface with markings 812 or unique patterns and templates for optical recognition.

In at least one embodiment, boats 824 traveling under a bridge 810 have visibility to one or more encoded control features 800 navigation under the bridge 810 where other navigational aids such as global navigation satellite systems (GNSS), are blocked.

In at least one embodiment, manned or unmanned aerial vehicles 816, 820, 822 may utilize the intelligent infrastructure to assist on-board navigation modules.

In at least one embodiment, for UAVs 816 that operate near the surface of the earth, they may incorporate cameras that measure and acquire data of the earth below. Such data may be used for imaging a terrestrial transportation system to improve or augment the UAVs' 816 positioning and orientation estimate. Navigation modules may include one or more software applications or hardware components including or having access to information or data regarding aspects of transportation systems within a given region, including the locations, dimensions, capacities, conditions, statues or other attributes of various paths or routes in the region (e.g., one or more sets of rails, roads, or shipping channels). For example, the navigation modules may receive inputs from sensors such as a GPS receiver, an imaging device, or another sensor, and determine and optimal direction and/or an optimal speed of the UAV 816 for traveling on a given path or route based on such inputs. The navigation modules may select a path or route to be traveled by the UAV 816, and may provide information or data regarding the selected path or route to a control system.

Automobiles systems, aerial systems (manned and unmanned), or off-highway vehicles that are often used to construct the highways may benefit from a precision terrestrial survey network of easily visible control features 800. These control features 800 are easily extracted features under a wide variety of atmospheric and illuminating conditions. A preferred embodiment may include passive points/targets (e.g., tennis balls or other similarly visible spheres), "360" degree prisms that retransmit sunlight or other point sources, and illuminated point sources (e.g., beacons, light bulbs, street lights, etc.). Attributes such as, but not limited to, spectral signatures, shapes, sizes, and illumination patterns (e.g., flashing) can assist the vision system in positively identifying point characteristics such as accuracy, owner, etc.

Figure 9:
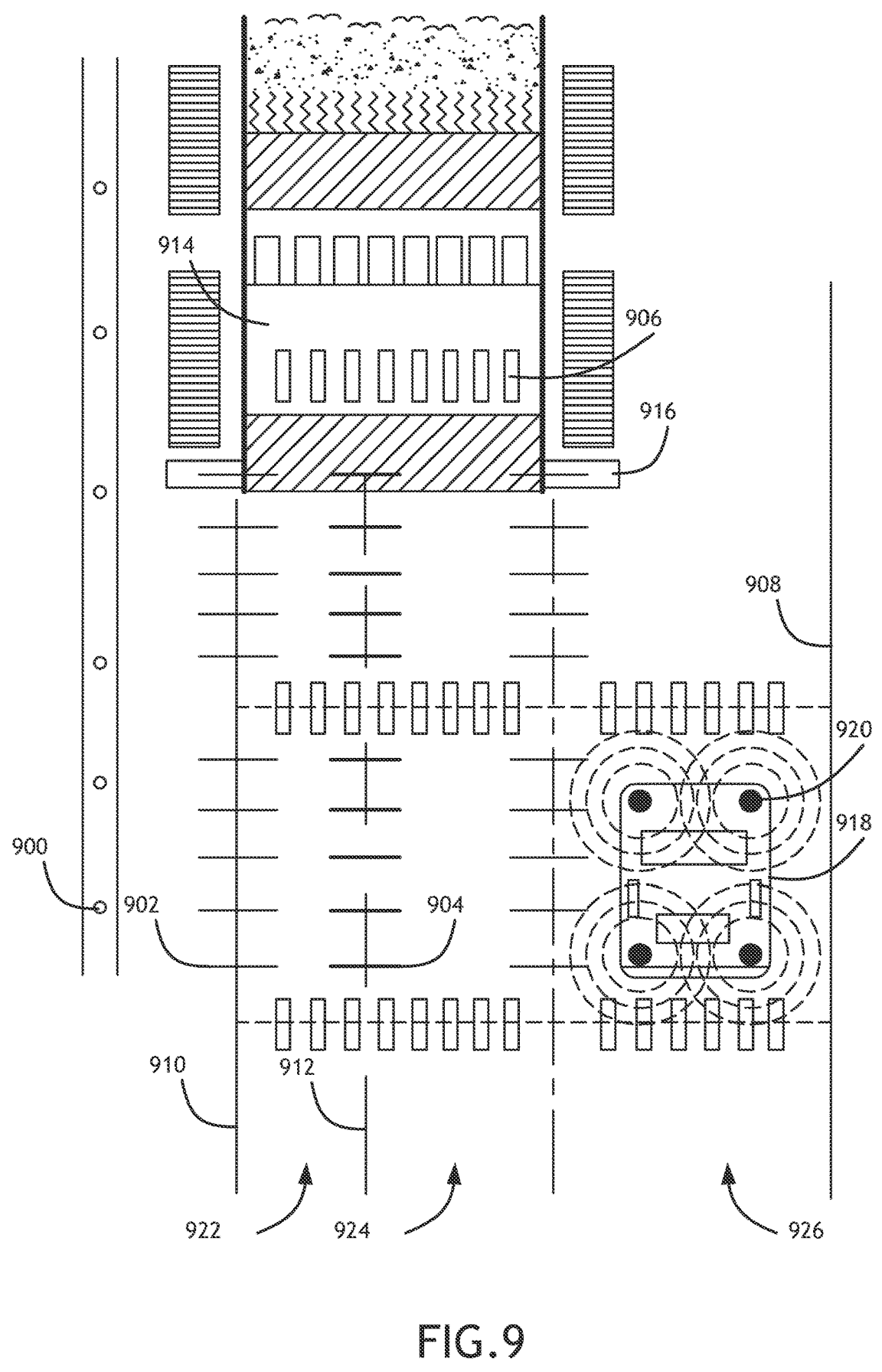

Referring to FIG. 9, a top plan view of a concrete paving machine according to embodiments of the present disclosure is shown. In at least one embodiment, the concrete paving machine 914 may also embed structural steel, including smooth dowel bars 906 and continuous rebar more complex patterns, typically installed to add structural integrity to the roadway 926, while navigating using a vision system having one or more cameras 916 for observing various embedded control features 900. Furthermore, a separate vehicle 918 may utilize subsurface sensors 920 to identify embedded steel to augment its own navigation and guidance system and send derived information to the concrete paving machine 914 to augment on-board guidance of the concrete paving machine 914.

Sidebars 902 may be inserted into the side of the slab and therefore half way embedded into the left side 910 and right side. The tie bars 904 and sidebars 902 tie the lanes 924 together, including a shoulder 922, left lane 924, and right lane with the right lane having a right edge 908. Following the concrete paving machine 914 on the earliest entry, a longitudinal joint 912 is cut and results in a lane edge.

Additional data includes the transverse saw joint at the dowel bars 906. Following the installation of the steel in the slab, subsurface sensors 920 on vehicles 918 can be used to both measure the position of them, and also in reverse measure the position of the sensor from the known location of the bars.

In at least one embodiment, the concrete paving machine 914 includes a convectional control system to guide its steering and grade control.

Figure 10A:
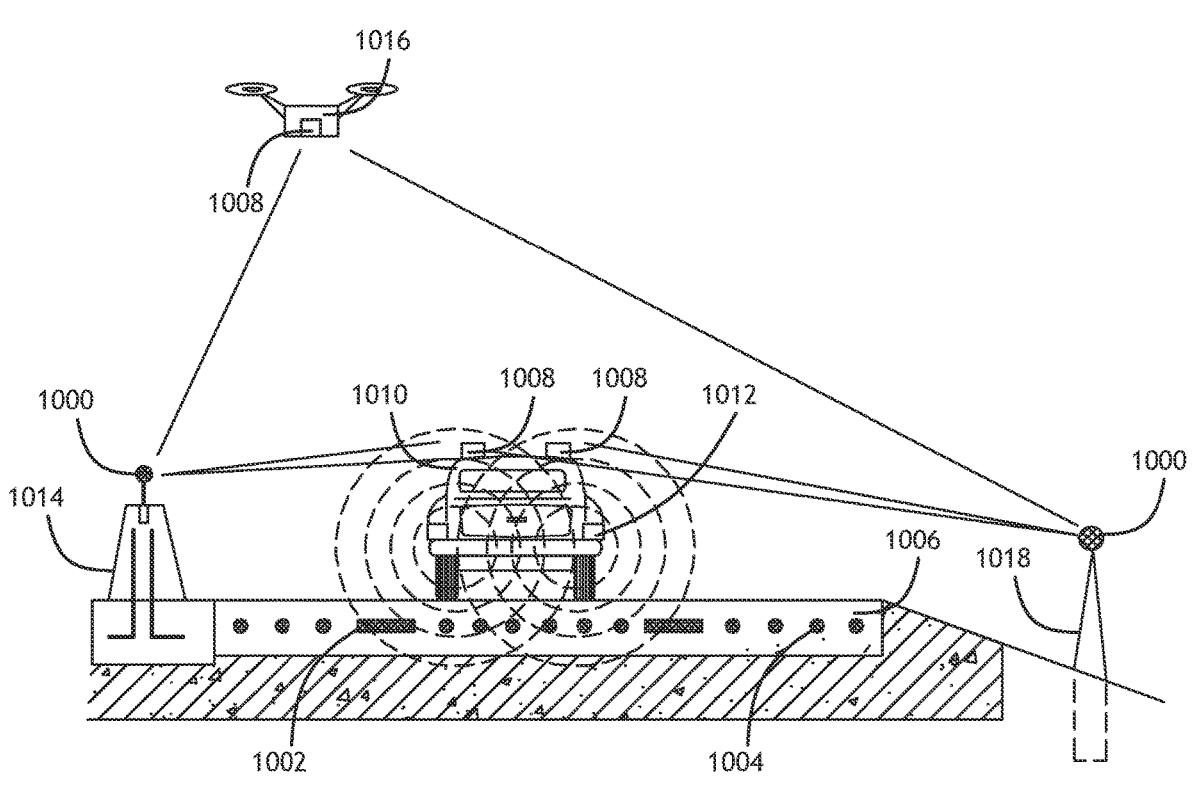
FIG. 10A shows a front environmental view of a system including embodiments of the present disclosure utilizing both a vision system and sensors.
Figure 10B:
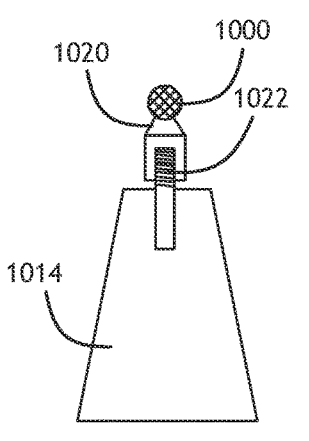
FIG. 10B shows a cross-sectional view of a barrier and encoded control feature according to embodiments of the present disclosure.
Figure 10C:
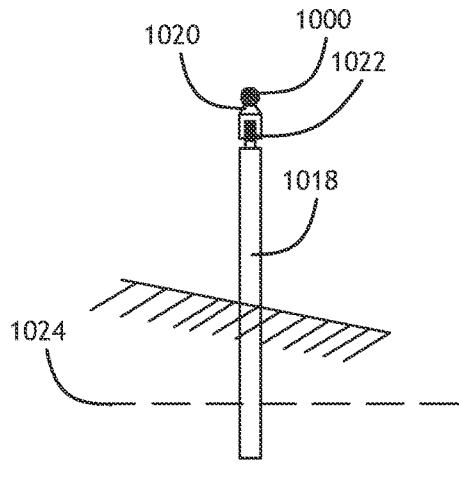
FIG. 10C shows a side view of a post and encoded control feature system according to embodiments of the present disclosure.

Referring to FIGS. 10A-10C, a front environmental view of a system including embodiments of the present disclosure utilizing both a vision system and sensors, a cross-sectional view of a barrier, and a side view of a post 1018 and encoded control feature 1000 system are shown. A vehicle 1010 and UAV 1016 having computer systems according to embodiments of the inventive concepts disclosed herein may identify embedded steel bars 1002, 1004, encoded control features 1000, and visible encoded feature lines of a roadway 1006 for pose estimation and control. The encoded control features 1000 may be mounted to a barrier 1014 that is part of the roadway or a post 1018, separate from the roadway. The vehicle 1010 may include cameras 1008 and subsurface sensors 1012, while the UAV 1016 only uses cameras 1008.

The encoded control feature 1000 may be a lamp, sphere or ball, survey prism, etc., mounted to an anchor bolt 1022 embedded in the barrier via an adapter mount 1020. Being affixed to a threaded bolt, the encoded control feature may be a prism or GNSS antenna during construction, surveying and mapping; and the replaced with lights or passive targets coincident with a surveyed position.

The encoded control feature 1000 may be a lamp, sphere or ball, survey prism, etc., mounted to an anchor bolt 1022 comprising a portion of the post 1018 via an adapter mount 1020. Being affixed to a threaded bolt to accept interchangeable encoded control features 1000 such as a prism or GNSS antenna during construction, surveying and mapping; and lights or passive targets coincident with a surveyed position. The post 1018 is placed below the frost (heave) line 1024 to minimize heaving the years. The post 1018 may be installed automatically with a precision construction vehicle. Because the post 1018 is placed automatically with high precision, maintenance and mowing machines can automatically avoid post 1018.

Figure 11:
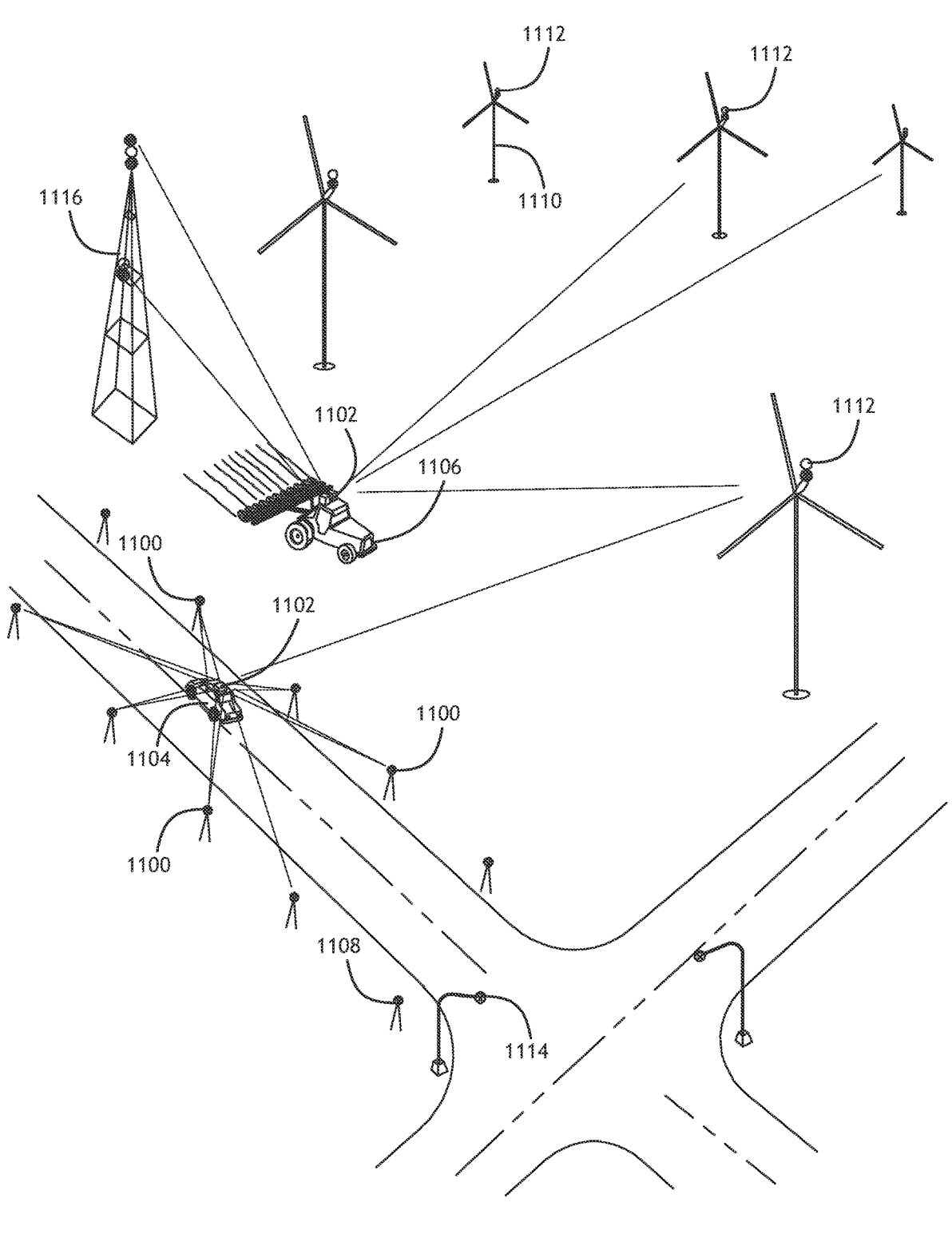
FIG. 11 shows an environmental view of rural applications of embodiments of the present disclosure.

Referring to FIG. 11, an environmental view of rural applications of embodiments of the present disclosure is shown. Various mobile and stationary machines 1110, 1114, 1116 comprise or include observable features such as street lights 1114, wind turbine towers 1110, wind turbine indicator lamps 1112, radio tower lights 1116, etc. One or more of these features 1114, 1110, 1112, 1116 may include some variability in position; for example, the wind turbine indicator lamps 1112 pivot with the wind turbine towers 1110. However, at a considerable distance, they can be treated as point sources and their uncertain position weighted in within the calculated adjustments. Encoded control features 1100 and posts 1108 may be installed along a right-of-way and observed by both on-highway vehicles 1104 and agricultural machines 1106 via on-board cameras 1102 or other sensors for guidance and control.

In at least one embodiment, certain environmental conditions may be tracked via sensors on-board the various mobile and stationary machines 1110, 1114, 1116, such as wind speed sensors or rain sensors.

In at least one embodiment, an agricultural machine 1106 receives data corresponding to the environmental conditions and correlates the environmental features and conditions to create a local environmental map in real-time. The agricultural machine 1106 uses the local environmental map to orient itself.

Embodiments of the present disclosure provide a paving machine that can have periodic interruptions in consistent data delivery from sensors while maintaining a smooth trajectory throughout and after any interruptions.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A paving machine comprising:
a plurality of optical sensors, at least one of the optical sensors configured to produce overlapping fields of view;
a dead reckoning system comprising a plurality of sensors, the dead reckoning system configured to determine a forward travel distance over time;
a plurality of tracks;
a plurality of track actuators, each corresponding to a track and configured to translate to raise and lower the paving machine with respect to the corresponding track; and
at least one processor in data communication with a memory storing processor executable code for configuring the at least one processor to:
  receive a design profile;
  receive images from the plurality of optical sensors;
  identify an overlap in images from at least two optical sensors;
  identify at least one feature of another machine positioned forward of the paving machine in a paving train, the at least one feature being in the overlap;
  determine a location and orientation of features outside the overlap and relative positioning between the paving machine and the other machine in the paving train;
  calculate parallax of foreground and background features in the images based on the location and orientation of features inside the overlap;
  determine a location of the paving machine based on the identified feature and parallax with respect to the design profile;
  identify a plurality of transition values;
  receive one or more manually entered transition points;
  interpolate additional transition values to produce a smooth transition between the plurality of transition values and the one or more manually entered transition points;
  determine a set of actuator offsets for each of the actuators, each actuator offset associated with a location in the design profile based on the transition values, including the transition values associated with the interpolated transition values;
  determine a smooth transition between actuator offsets based on a track speed and the determined location of the paving machine along the design profile;
  apply the smooth transition;
  receive a dead reckoning position from the dead reckoning system;
  accumulate an error in the dead reckoning system over time and progressively weight the determined forward travel distance based on the accumulated error by reducing reliance on the dead reckoning position as the accumulated error increases; and
  provide a stopping fault if the accumulated error exceeds a preset tolerance.

2. The paving machine of claim 1, wherein:
each actuator comprises a controller, the controller being one of the at least one processors, and a linear position sensor in data communication with the controller; and
the at least one processor is configured to send actuator offsets to the controller.

3. The paving machine of claim 2, wherein a first actuator controller comprises a master controller and each other actuator controller comprises a slave controller.

4. The paving machine of claim 2, further comprising:
at least one paving attachment; and
at least one paving attachment actuator configured to move the at least one paving attachment,
wherein the at least one processor is further configured to:
  determine a second set of actuator offsets for the at least one paving attachment actuator, each actuator offset associated with the location in the design profile; and
  determine a second smooth transition between actuator offsets.

5. The paving machine of claim 4, wherein:
the paving attachment comprises a pan having multiple, independently adjustable pan sections; and
each pan section corresponding to at least one of the paving attachment actuators,
wherein the at least one processor is further configured to:
  determine a set of cross-slope values for each pan section; and
  determine a smooth transition between each cross-slope value.

6. The paving machine of claim 1, further comprising at least one contact sensor in data communication with at least one processor, wherein the at least one processor is further configured to:
receive depth values from the at least one contact sensor;
determine an offset between each of the depth values and a predetermined surface height; and
calculate a paving material quantity based on the offsets.

7. A method comprising:
receiving a design profile defining a paving operation;
receiving images from a plurality of optical sensors configured to produce overlapping fields of view;
identifying an overlap in images from at least two optical sensors;
identifying at least one feature of another machine positioned forward of the paving machine in a paving train, the at least one feature being in the overlap;
determining a location and orientation of features outside the overlap and relative positioning between the paving machine and the other machine in the paving train;
calculating parallax of foreground and background features in the images based on the location and orientation of features inside the overlap;

determining a location of the paving machine based on the identified feature and parallax with respect to the design profile;

identifying a plurality of transition values;

receiving one or more manually entered transition points;

interpolating additional transition values to produce a smooth transition between the plurality of transition values and the one or more manually entered transition points;

determining a set of actuator offsets for each of a plurality of actuators, each actuator associated with a track on a paving machine, each actuator offset associated with a location in the design profile based on the transition values, including the transition values associated with the interpolated transition values;

determining a smooth transition between actuator offsets based on a track speed and the determined location of the paving machine along the design profile;

applying the smooth transition;

receiving a dead reckoning position;

accumulating an error in the dead reckoning position over time and progressively weight a determined forward travel distance based on the accumulated error by reducing reliance on the dead reckoning position as the accumulated error increases; and providing a stopping fault if the accumulated error exceeds a preset tolerance.

8. The method of claim 7, wherein each actuator comprises a controller, the controller and a linear position sensor in data communication with the controller; further comprising sending actuator offsets to the controller.

9. The method of claim 8, wherein a first actuator controller comprises a master controller and each other actuator controller comprises a slave controller.

10. The method of claim 8, further comprising:

determining a second set of actuator offsets for at least one paving attachment actuator, the at least one paving attachment actuator associated with a paving attachment, each actuator offset associated with the location in the design profile; and determining a second smooth transition between actuator offsets.

11. The method of claim 10, wherein:

the paving attachment comprises a pan having multiple, independently adjustable pan sections; and each pan section corresponding to at least one of the paving attachment actuators;

further comprising:

determining a set of cross-slope values for each pan section; and determining a smooth transition between each cross-slope value.

12. The method of claim 7, further comprising:

receiving depth values from at least one contact sensor;

determining an offset between each of the depth values and a predetermined surface height; and calculating a paving material quantity based on the offsets.

13. A system comprising:

a plurality of optical sensors, at least one of the optical sensors configured to produce overlapping fields of view;

a dead reckoning system comprising a plurality of sensors, the dead reckoning system configured to determine a forward travel distance over time;

a plurality of tracks;

a plurality of track actuators, each corresponding to a track and configured to translate to raise and lower the paving machine with respect to the corresponding track; and at least one processor in data communication with a memory storing processor executable code for configuring the at least one processor to:

receive a design profile;

receive images from the plurality of optical sensors;

identify an overlap in images from at least two optical sensors;

identify at least one feature of another machine positioned forward of the paving machine in a paving train, the at least one feature being in the overlap;

determine a location and orientation of features outside the overlap and relative positioning between the paving machine and the other machine in the paving train;

calculate parallax of foreground and background features in the images based on the location and orientation of features inside the overlap;

determine a location of the paving machine based on the identified feature and parallax with respect to the design profile;

identify a plurality of transition values;

receive one or more manually entered transition points;

interpolate additional transition values to produce a smooth transition between the plurality of transition values and the one or more manually entered transition points;

determine a set of actuator offsets for each of the actuators, each actuator offset associated with a location in the design profile based on the transition values, including the transition values associated with the interpolated transition values;

determine a smooth transition between actuator offsets based on a track speed and the determined location of the paving machine along the design profile;

apply the smooth transition;

receive a dead reckoning position from the dead reckoning system;

accumulate an error in the dead reckoning system over time and progressively weight the determined forward travel distance based on the accumulated error by reducing reliance on the dead reckoning position as the accumulated error increases; and provide a stopping fault if the accumulated error exceeds a preset tolerance.

14. The system of claim 13, wherein:

each actuator comprises a controller, the controller being one of the at least one processors, and a linear position sensor in data communication with the controller; and the at least one processor is configured to send actuator offsets to the controller.

15. The system of claim 14, wherein a first actuator controller comprises a master controller and each other actuator controller comprises a slave controller.

16. The system of claim 14, further comprising:

at least one paving attachment; and at least one paving attachment actuator configured to move the at least one paving attachment, wherein the at least one processor is further configured to:

determine a second set of actuator offsets for the at least one paving attachment actuator, each actuator offset associated with the location in the design profile; and determine a second smooth transition between actuator offsets.

17. The system of claim 16, wherein:

the paving attachment comprises a pan having multiple, independently adjustable pan sections; and each pan section corresponding to at least one of the paving attachment actuators, wherein the at least one processor is further configured to:

determine a set of cross-slope values for each pan section; and determine a smooth transition between each cross-slope value.

\* \* \* \* \*